(12) United States Patent
Papakipos et al.

(10) Patent No.: US 9,529,417 B2
(45) Date of Patent: Dec. 27, 2016

(54) PERFORMING SELECTED OPERATIONS USING LOW POWER-CONSUMING PROCESSORS ON USER DEVICES

(75) Inventors: Matthew Nicholas Papakipos, Palo Alto, CA (US); David Harry Garcia, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 694 days.

(21) Appl. No.: 13/096,197

(22) Filed: Apr. 28, 2011

(65) Prior Publication Data

US 2012/0278641 A1 Nov. 1, 2012

(51) Int. Cl.
*G06F 15/16* (2006.01)
*G06F 1/32* (2006.01)
*H04L 29/06* (2006.01)

(52) U.S. Cl.
CPC ............ *G06F 1/3293* (2013.01); *H04L 69/04* (2013.01); *G06F 1/3203* (2013.01); *G06F 1/3209* (2013.01); *Y02B 60/121* (2013.01)

(58) Field of Classification Search
CPC .............................. G06F 1/3293; G06F 1/3209
USPC ................................. 709/204, 250; 713/323
See application file for complete search history.

(56) References Cited

U.S. PATENT DOCUMENTS

| | | | | |
|---|---|---|---|---|
| 6,701,160 B1 * | 3/2004 | Pinder | ................... | H04M 1/663 455/418 |
| 6,886,105 B2 * | 4/2005 | Kahn et al. | ................... | 713/323 |
| 8,601,162 B1 | 12/2013 | O'Shaughnessy | | |
| 8,825,842 B2 | 9/2014 | Papakipos | | |
| 2004/0225718 A1 | 11/2004 | Heinzel | | |
| 2006/0031343 A1 | 2/2006 | Chern | | |
| 2006/0031527 A1 | 2/2006 | Soles | | |
| 2006/0224681 A1 * | 10/2006 | Wurster | ................... | H04L 51/18 709/206 |
| 2006/0235970 A1 | 10/2006 | Bateman | | |
| 2007/0214180 A1 | 9/2007 | Crawford | | |
| 2007/0245017 A1 | 10/2007 | Shintai | | |
| 2008/0104227 A1 | 5/2008 | Birnie | | |
| 2008/0284607 A1 * | 11/2008 | Hyoung et al. | ............. | 340/573.1 |
| 2009/0037393 A1 | 2/2009 | Fredricksen | | |
| 2009/0113451 A1 | 4/2009 | Grigsby | | |
| 2009/0135751 A1 * | 5/2009 | Hodges et al. | ............... | 370/311 |
| 2009/0163183 A1 | 6/2009 | O'Donoghue | | |
| 2009/0177770 A1 | 7/2009 | Jeong | | |
| 2009/0234957 A1 | 9/2009 | Li | | |
| 2009/0259865 A1 * | 10/2009 | Sheynblat | ............. | G06F 1/3203 713/323 |
| 2009/0305732 A1 * | 12/2009 | Marcellino et al. | .......... | 455/466 |
| 2009/0307715 A1 | 12/2009 | Santamaria | | |

(Continued)

FOREIGN PATENT DOCUMENTS

KR   10-2006-0051360   5/2006

OTHER PUBLICATIONS

U.S. Appl. No. 14/943,275, filed Nov. 17, 2015, Matthew Nicholas Papakipos.

(Continued)

*Primary Examiner* — John Macilwinen
(74) *Attorney, Agent, or Firm* — Baker Botts L.L.P.

(57) ABSTRACT

In one embodiment, a first computing device receives a communication from a second computing device; and if the communication is a ping from the second computing device, then sends a response to the ping to the second computing device using a secondary processor of the first computing device.

17 Claims, 8 Drawing Sheets

(56) References Cited

U.S. PATENT DOCUMENTS

| | | |
|---|---|---|
| 2009/0313492 A1* | 12/2009 | Lerman .................. 713/323 |
| 2010/0041386 A1 | 2/2010 | Anderson |
| 2010/0138501 A1 | 6/2010 | Clinton |
| 2010/0153501 A1 | 6/2010 | Gabriel |
| 2010/0217872 A1 | 8/2010 | Martchenko |
| 2010/0325194 A1 | 12/2010 | Williamson |
| 2011/0029598 A1 | 2/2011 | Arnold |
| 2011/0162062 A1 | 6/2011 | Kumar |
| 2011/0173681 A1 | 7/2011 | Qureshi |
| 2011/0196964 A1 | 8/2011 | Natarajan |
| 2011/0219422 A1 | 9/2011 | Shen |
| 2011/0231478 A1 | 9/2011 | Wheeler |
| 2011/0238784 A1 | 9/2011 | Takazawa |
| 2011/0258429 A1 | 10/2011 | Hsu |
| 2011/0280247 A1 | 11/2011 | Roskind |
| 2012/0042004 A1 | 2/2012 | Shenfield |
| 2012/0066330 A1 | 3/2012 | Fan |
| 2012/0100895 A1* | 4/2012 | Priyantha et al. ............ 455/574 |
| 2012/0150973 A1 | 6/2012 | Barak |
| 2012/0158755 A1 | 6/2012 | Gammill |
| 2012/0167137 A1 | 6/2012 | Wong |
| 2012/0173610 A1 | 7/2012 | Bleau |
| 2012/0173645 A1 | 7/2012 | Marcellino |
| 2012/0198006 A1 | 8/2012 | Moayerzadeh Ahmadi |
| 2012/0210415 A1 | 8/2012 | Somani |
| 2012/0239507 A1 | 9/2012 | Braginsky |
| 2012/0278385 A1 | 11/2012 | Papakipos |
| 2012/0324041 A1 | 12/2012 | Gerber |
| 2012/0331047 A1 | 12/2012 | Sana |
| 2013/0091229 A1 | 4/2013 | Dunn |
| 2013/0166445 A1 | 6/2013 | Isaacson |
| 2014/0330933 A1 | 11/2014 | Papakipos |
| 2014/0349636 A1* | 11/2014 | Thompson ............ H04M 3/436 455/418 |

OTHER PUBLICATIONS

"Data logging" definition, BBC Bitesize ICT [online] [Retrieved on May 13, 2014], Retrieved from: <URL: www.bbc.co.uk/schools/gcsebitesize/ict/measurecontrol/3dataloggingrev1.shtml>, May 13, 2014.

International Search Report and Written Opinion for International Application No. PCT/US2012/035078, Oct. 29, 2012.

RFC: 793, "Transmission Control Protocol Darpa Internet Program, Protocol Specification", Information Sciences Institute, University of Southern California, Sep. 1981.

* cited by examiner

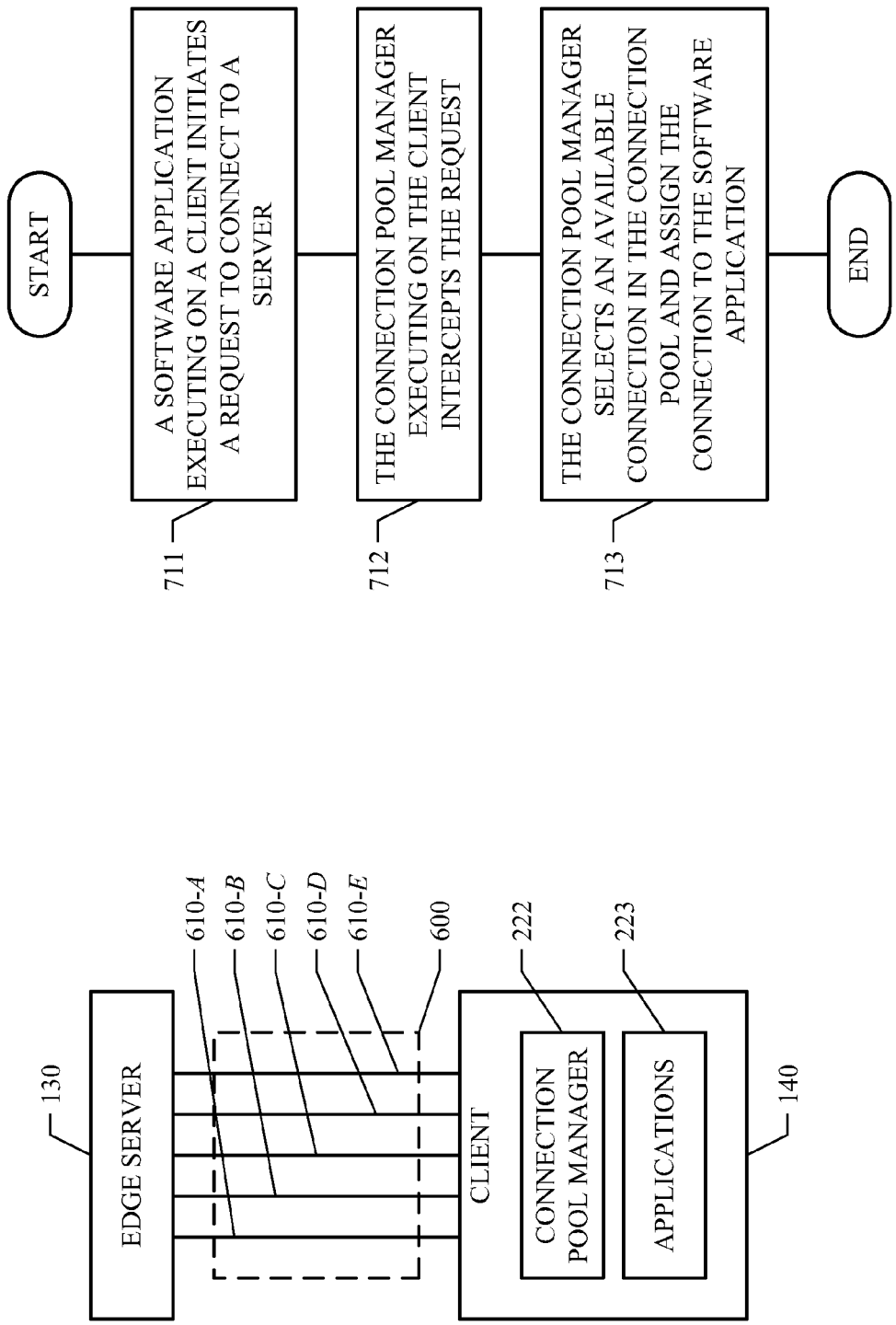

PERFORMING SELECTED OPERATIONS USING LOW POWER-CONSUMING PROCESSORS ON USER DEVICES

TECHNICAL FIELD

This disclosure generally relates to transmitting data between two electronic devices and more specifically relates to managing communication connections between a server and a client and transmitting data between the server and the client over the communication connections.

BACKGROUND

When two electronic devices are connected to a network (e.g., a computer or communication network), data may be transmitted between the two devices over the network using one or more suitable network protocols. For example, in a client-server environment, data may be transmitted between a server and a client over a network to which both the server and the client are connected. Of course, a network may include any number of sub-networks. By transmitting data between the two devices, the two devices may communicate with each other.

In network communications, there are two ways to send a communication from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction.

SUMMARY

This disclosure generally relates to transmitting data between two electronic devices and more specifically relates to managing communication connections between a server and a client and transmitting data between the server and the client over the communication connections.

In particular embodiments, a first computing device, receives a communication from a second computing device; and if the communication is a ping from the second computing device, then sends a response to the ping to the second computing device using a secondary processor of the first computing device.

These and other features, aspects, and advantages of the disclosure are described in more detail below in the detailed description and in conjunction with the following figures.

BRIEF DESCRIPTION OF THE DRAWINGS

FIG. 6 illustrates an example connection pool between two devices.
FIG. 7 illustrates an example method for sharing connections in a connection pool among multiple software applications.

DESCRIPTION OF EXAMPLE EMBODIMENTS

Figure 1:
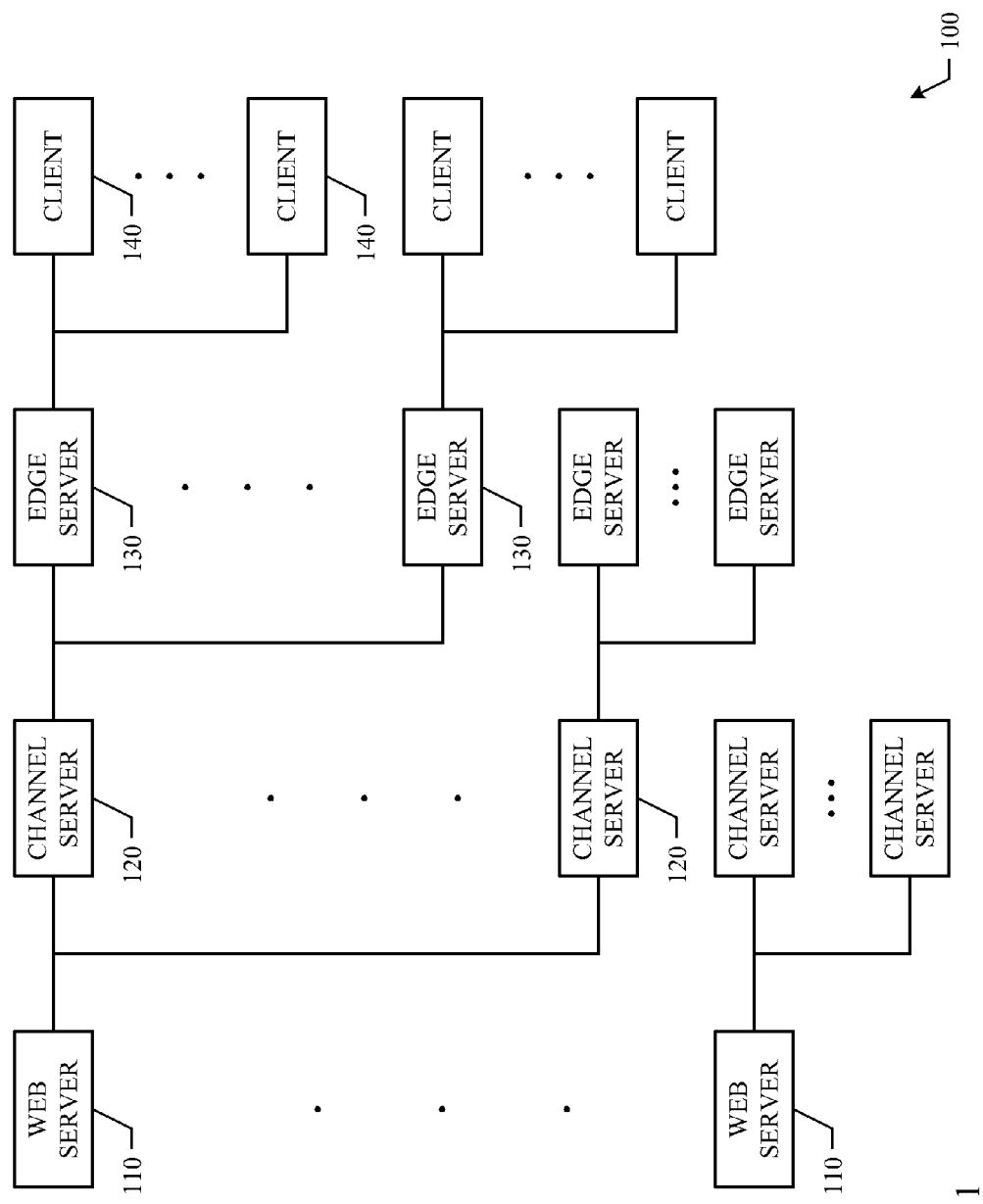
FIG. 1 illustrates an example client-server environment.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In network communications, one device may "push" a communication to another device. In particular embodiments, with push technology, the sending device typically initiates the communication transaction and may transmit the communication to the receiving device without obtaining a permission from the receiving device first. In other words, the communication is "pushed" to the receiving device whether or not the receiving device actually wants to receive the communication.

Push technology may be used under various circumstances. For example, in a client-server environment, a server may push communications to a client. The client may be any type of electronic device capable of network communications. In particular embodiments, the client may be a mobile device (e.g., a mobile telephone, a smart phone, a tablet computer, etc.) capable of wireless communications, and the server may push communications, sent over a mobile network or a wireless network, to the mobile client. Alternatively or in addition, in particular embodiments, the client may be a non-mobile computing device (e.g., a desktop computer) capable of connecting to a computer network through a wired connection (e.g., an Ethernet connection). The server may push communications to the non-mobile client over the computer network (e.g., the Internet).

In particular embodiments, a social-networking system implemented, for example, as a social-networking website, may push communications to the client devices of its users. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

There are various types of communications that may be pushed to a client device, such as, for example and without limitation, system update messages, software update messages, advertisements, alerts, user account notices, social-networking messages, service agreement updates, or a combination of different types of communications. This disclosure contemplates any applicable types of communications. A client device may be connected to a network via a wireless or wire-line connection using any suitable communication or network protocol (e.g., TCP/IP). In particular embodiments, a communication pushed to a client may be referred to as a "push notification". An example push notification is a Short Message Service (SMS) notification. The content of the individual notifications may vary. Often the content of a notification may concern an entity, which may a human or a non-human entity (e.g., an organization, a location, a product, a software application, a movie, a subject matter, etc.). A notification may originate from the social-networking system (e.g., notifications on social information or social connections) or from a third party (e.g., notifications on the third-party's products or services).

Sometimes, the user devices to which the notifications are pushed may be mobile devices (e.g., mobile telephones or tablet computers). Given the relatively small size of the display of a typical mobile device, the notifications are often displayed as overlays on the current interface view. Some push notifications may be interruptive and some may be non-interruptive. In particular embodiments, an interruptive push notification, when pushed to a client, may be presented to the user of the client immediately or soon after it is received by the client. Even if the user is performing other activities with the client, the activities may be interrupted and suspended by the interruptive push notification. The user may need to respond to the interruptive push notification first before he/she can continue with performing the other activities with the client. For example, suppose that an error alert is pushed to a smart phone (e.g., an iPhone or Blackberry) while the user of the smart phone is checking map directions using Google Maps. If the error alert is an interruptive notification, then the error alert may be presented to the user immediately after it is received by the smart phone, and the user may need to respond to the error alert (e.g., push a button to indicate that the user is aware of the error) before the user may continue with checking map directions. On the other hand, a non-interruptive push notification, when pushed to a client, may be stored on the client for some period of time before it is presented to the user of the client. A non-interruptive push notification typically does not require the user's immediate attention. Instead, the user may respond to it at leisure (e.g., when the user has time). For example, suppose that a coupon from a coffee house near the current location of a user is pushed to the user's smart phone while the user is sending an instant message to his friend using the smart phone. Since this type of notification is less important than what the user is currently doing with his phone (i.e., sending a message), it may not be desirable (e.g., considered too invasive) to interrupt the user's message-sending activities only to show the coupon to the user. Thus, the coupon may be temporarily stored on the user's smart phone, and shown to the user after the user has completed sending the message.

In particular embodiments, when selecting specific notifications to be pushed to a specific user's device at specific times, the selections may be based on various factors. This disclosure contemplates any relevant factor. In particular embodiments, given a specific user and a specific time, one or more notifications may be selected to be pushed to the user's device based on, without limitation, the current time (e.g., morning vs. afternoon vs. evening, or weekdays vs. weekends), the current location of the user (e.g., work vs. home, restaurant, shops, theater, etc.), which may be derived from the GPS coordinates or the communication signals of the user's device or the Internet Protocol (IP) address of the user's device, the current activity of the user (e.g., in a meeting, making a phone call, eating lunch or dinner, watching a movie, etc.). The notifications may also be selected based on the user's social information or social activities. For example, if the user has a close social connection (e.g., a family member or a friend), then notifications about the current status of the user's social connection may be pushed to the user's device from time to time. If the user takes any action in connection with an entity on the social-networking system, notifications about the entity may be pushed to the user's device from time to time.

Each user has a set of social connections (e.g., families, friends, coworkers, business associates, etc.). Among them, the user may consider some of them more important than others. For example, a user may consider immediate family members (e.g., spouses, children, or parents) or long-term good friends more important than casual acquaintances. In particular embodiments, notifications relating to people who are closer or more important to a user may be pushed more frequently than those relating to people who are less important to the user. In addition, in particular embodiments, notifications relating to people who are closer or more important to a user may be designated as interruptive notifications, while notifications relating to people who are less important to the user may be designated as non-interruptive notifications. For example, suppose that a user is browsing the web using his mobile device when his wife sends an instance message. Such a message from the user's wife (i.e., a person considered to be very important to the user) may be designated as interruptive message so that the user can read and respond to the message immediately upon receiving it.

In particular embodiments, advertisements may optionally be pushed to a user's device, especially if a specific user does not object to such kind of information or is interested in a particular product. For example, if the user has mentioned a product in a message posted on the social-networking system, advertisements about that product may be pushed to the user's device. If the user has mentioned a person (e.g., expressing an interest or a liking in a celebrity), the current status of that person may be pushed to the user's device. If the user has indicated that he/she likes something or someone (e.g., a product, a place, a movie, a book, a celebrity, etc.), then notifications about what or whom the user likes may be pushed to the user's device. If the user likes a web page, then notifications about the entity with which the content of the web page is concerned may be pushed to the user's device. In particular embodiments, certain types of notifications (e.g., advertisements) may be pushed to a user's device less frequently than other types of nonfictions (e.g., messages from friends) so that the user is not annoyed with them.

In particular embodiments, for a given user and a given notification, a relevance score may be computed for the notification with respect to the user, which indicates how relevant the notification is to the user. If the notification is considered relevant to the user (e.g., having a high relevance score), then the notification may be pushed to the user's device. Conversely, if the notification is considered not sufficiently relevant to the user (e.g., having a low relevance score), then the notification is not pushed to the user's device. In particular embodiments, the relevance score of a notification with respect to a user may be determined based on various factors, such as, without limitation, a location value, which compares the location of the entity of the notification and the current location of the user, an interest value, which indicates whether the entity of the notification is or is not included in the user's interests, a time value, which determines whether the current time is within the delivery time range for the entity of the notification, and a connection value, which indicates the number of the user's social connections are associated with the entity of the notification. These different values may be combined to determine the relevance score. Computing notification relevance score is described in more detail in U.S. patent application Ser. No. 12/976,755, entitled "Pricing Relevant Notifications Provided to a User Based on Location and Social Information", filed on Dec. 22, 2010, which is incorporated by reference in its entirety and for all purposes.

FIG. 1 illustrates an example client-server environment 100 in which a communication may be pushed to a client device. In particular embodiments, the client device may be a mobile device associated with a user. There may be any number of servers 110, 120, 130 of various types and any number of clients 140 of various types. Each server 110, 120, or 130 may include hardware, software, or embedded logic components or a combination of two or more such components for carrying out the appropriate functionalities implemented or supported by server 110, 120, or 130. In particular embodiments, servers 110, 120, and 130 may be arranged in tiers. For example, there may be one or more web servers 110 for hosting a social-networking website. Each web server 110 may be connected with one or more channel servers 120. Each channel server 120 may be connected with one or more edge servers 130. Web servers 110, channel servers 120, and edge servers 130 may each perform some of the functionalities or operations supported by the social-networking website. For example, web servers 110 may host a network application or a web-based application, such as a social-networking application or website. Channel servers 120 may monitor and manage the available communication channels (e.g., media downloading or uploading, instant messaging, posting, emailing, chatting, presence, etc.) for the users of the application hosted by web servers 110. Edge servers 130 may maintain network or communication connections with user devices (e.g., clients 140) for messaging and other accesses. In addition, edge servers 130 may function as proxies for web servers 110. Clients 140 may communicate with web servers 110 through edge servers 130. In particular embodiments, servers 110, 120, and 130 and clients 140 may each have a unique identifier. For example, each server 110, 120, and 130 may be identified by its unique IP address, and each client 140 may be identified by its unique device identifier.

By using multiple servers, the workload of the social-networking website may be shared and balanced among the multiple servers and thus, the performance of the social-networking website may be improved. For example, the social-networking website may have hundreds of millions of users around the world, and at any given time, a great number of these users may be connected to the website through their respective user devices. New users may continually join the website as well. These users may be shared and balanced among multiple channel servers 120 to be serviced. In particular embodiments, a hash algorithm may be applied to the user identifier (e.g., the username or account number) of each user to determine to which channel server 120 a specific user is assigned. In addition or alternatively, channel servers 120 may be placed at different physical locations around the world, and a user may be assigned to a channel server 120 that is relatively close (e.g., in terms of physical distance) to the user's device. For example, a user located in Japan may be assigned to a channel server 120 located in Japan or China; while a user located in England may be assigned to a channel server 120 located in France.

In particular embodiments, each client 140 may be associated with a user as a user device. Each client 140 may be a mobile or non-mobile device and connected to a network wirelessly or through a wired connection. In particular embodiments, when a user connects with the social-networking website through his/her client 140 (i.e., the user device), client 140 may establish one or more connections with an edge server 130. Each connection may be a TCP/IP connection. More specifically, client 140 may be connected with an edge server 130 that is connected to the channel server 120 to which the user of client 140 is assigned.

For example, suppose that a specific user, A, is assigned to a specific channel server, 120-A (e.g., as a result of applying a hash algorithm to the user identifier of user A). When user A connects with the social-networking website through his user device, 140-A, client 140-A may establish one or more connections with an edge server, 130-A, that is connected with channel server 120-A. Similarly, suppose that another user, B, is assigned to a different channel server, 120-B (e.g., again, as a result of applying the hash algorithm to the user identifier of user B). When user B connects with the social-networking website through his user device, 140-B, client 140-B may establish one or more connections with an edge server, 130-B, that is connected with channel server 120-B.

In particular embodiments, each edge server 130 may be connected with one or more clients 140 and service these clients 140. A specific client 140 associated with a specific user may be connected with different edge servers 130 connected to the channel server 120 to which the user is assigned at different times. For example, suppose that multiple edge servers 130, including edge server 130-A, are connected with channel server 120-A, and user A is assigned to channel server 120-A. Further suppose that client 140-A associated with user A is connected with edge server 130-A. Then, client 140-A is disconnected from edge server 130-A (e.g., user A has disconnected the network connection of client 140-A or shut down client 140-A). Subsequently, when user A again connects with the social-networking website through client 140-A, client 140-A may either be connected with edge server 130-A again, or with another edge server that is also connected with channel server 120-A. In particular embodiments, edge servers 130 may be placed at different physical locations around the world, and a client 140 may be connected with an edge server 130 that is relatively close (e.g., in terms of physical distance) to that client 140. In addition or alternatively, a client 140 may be connected with an edge server 130 based on the current workload of edge servers 130. For example, in the case where multiple edge servers 130 are connected with channel server 120-A, to which user A is assigned, when client 140-A associated with user A needs to establish a connection with one of the edge servers 130 connected with channel server 120-A, the edge server currently services the least number of clients may be selected.

In particular embodiments, when a client 140 first establishes a connection with an edge server 130, client 140 may go through a registration process with edge server 130. During the registration process, client 140 may send its device identifier to edge server 130. Edge server 130 may forward the device identifier of client 140 to the channel server 120 connected with edge server 130. In particular embodiments, when client 140 disconnects from edge server 130, edge server 130 may again send the device identifier of client 140 to the channel server 120 connected with edge server 130. In particular embodiments, a channel server 120 may maintain, for each edge server 130 connected with it, a list of clients 140 currently connected with that edge server 130. This information may be stored in a lookup table. For example, suppose that channel server 120-A is connected with 6 edge servers, 130-A1 to 130-A6. The following illustrates an example table that may be used by channel server 120-A to keep track of clients currently connected with each of edge servers 130-A1 to 130-A6.

| EXAMPLE LOOKUP TABLE USED BY A CHANNEL SERVER | | |
| --- | --- | --- |
| EDGE SERVER | EDGE SERVER IP ADDRESS | CLIENTS CONNECTED WITH EDGE SERVER |
| 130-A1 | 162.54.89.2 | 21-3985, 65-1895, 85-7164 |
| 130-A2 | 162.54.78.54 | 25-1058, 21-4872 |
| 130-A3 | 162.54.78.160 | 45-9275, 13-6185, 01-6719, 2917 |
| 130-A4 | 162.54.89.124 | 06-7265, 54-3147 |
| 130-A5 | 162.54.78.18 | 37-8375, 75-8125, 92-7250 |
| 130-A6 | 162.54.78.32 | 51-5017 |

In the above example table, each client is identified by a unique combination of user identifier and device identifier (e.g., a pair of numbers, where the first number represents the user identifier and the second number represents the device identifier), and each edge server is identified by its IP address. Note that it is possible for the same user to have multiple user devices connected with the same or different edge servers 130 at the same time. For example, in the above table, the user whose identifier is "21" has two devices whose identifiers are "3985" and "4872", respectively. These two devices are connected with two edge servers 130-A1 and 130-A2, respectively.

Figure 2:
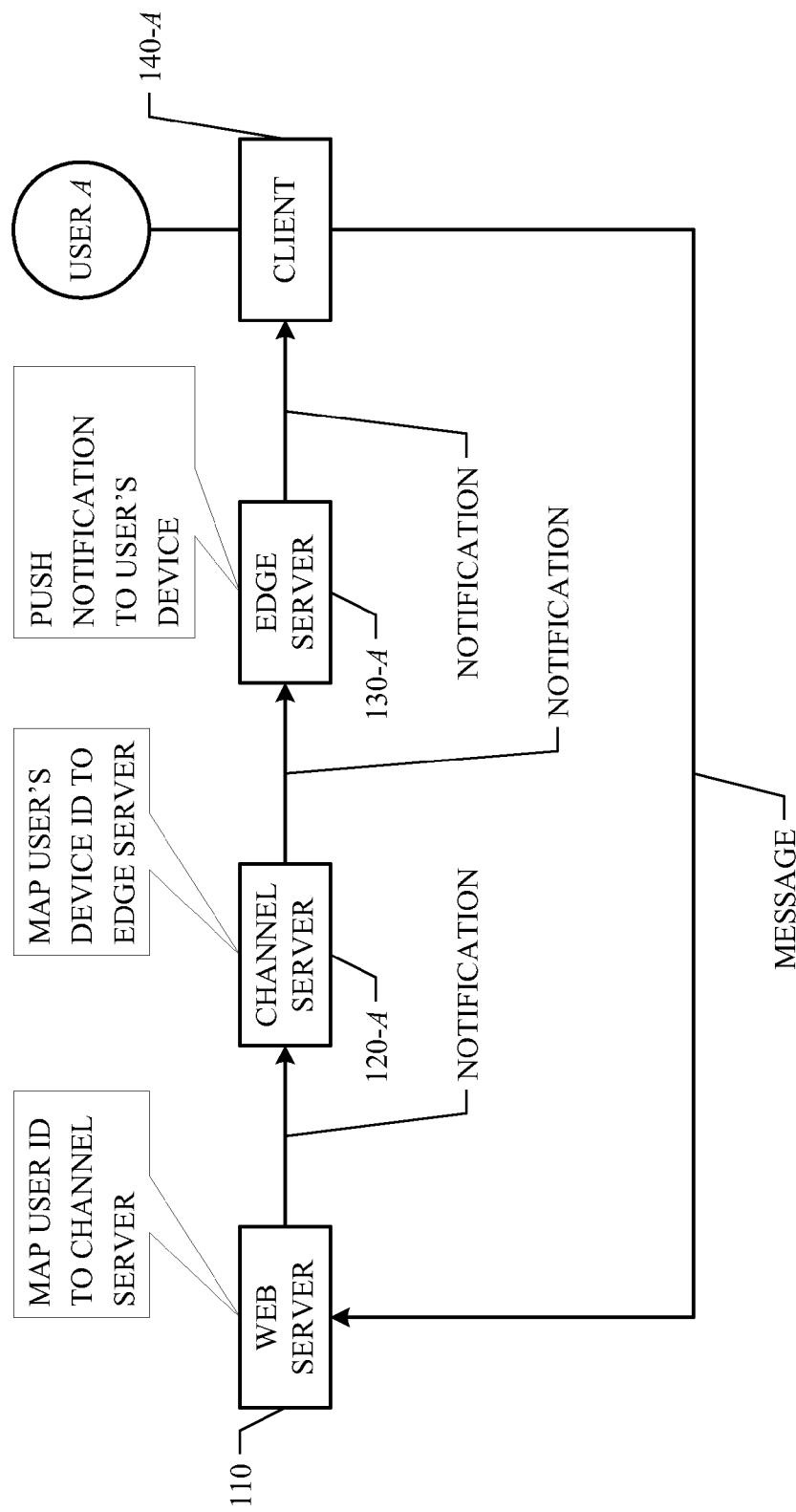
FIG. 2 illustrates an example of pushing a notification to a user's device.

In particular embodiments, a user may store, in his/her user profile with the social-networking system, the identifiers of his/her user devices. Based on this information, the social-networking system may be able to determine which client 140 is associated with which specific user. In particular embodiments, when the social-networking system needs to push a notification to a specific user (e.g., user A), a web server 110 may determine to which channel server 120 user A is assigned (e.g., channel server 120-A). For example, web server 110 may map the identifier of user A to channel server 120-A by applying a hash algorithm to the identifier of user A. The web server 110 connected with channel server 120-A may send the notification to channel server 120-A. Channel server 120-A may then determine whether user A has a user device (e.g., client 140-A) that is currently connected with one of edge servers 130 connected with channel server 120-A using information stored in a lookup table (e.g., the example lookup table illustrated above). That is, channel server 120-A may map the combination of the user identifier of user A and the device identifier of client 140-A to an edge server (e.g., edge server 130-A) connected with channel server 120-A using the lookup table maintained by channel server 120-A. If no user device associated with user A is currently connected with any edge server 130 connected with channel server 120-A, channel server 120-A may store the notification to be pushed to client 140-A at a future time when client 140-A is connected with one of edge servers 130 connected with channel server 120-A. On the other hand, if client 140-A is currently connected with one of edge servers 130 (e.g., edge server 130-A) connected with channel server 120-A, channel server 120-A may send the notification to edge server 130-A, which in turn may push the notification to client 140-A. In particular embodiments, when a user needs to send data (e.g., a message or a response to a notification received at the user's device) to the social-networking website, the user's device (e.g., client 140-A) may directly send the data to a web server 110 hosting the social-networking website. Alternatively, edge server 130-A may function as a proxy for web servers 110. In this case, client 140-A may communication with web servers 110 via edge server 103-A. FIG. 2 illustrates an example of pushing a notification to a user's device as described above.

Figure 3:
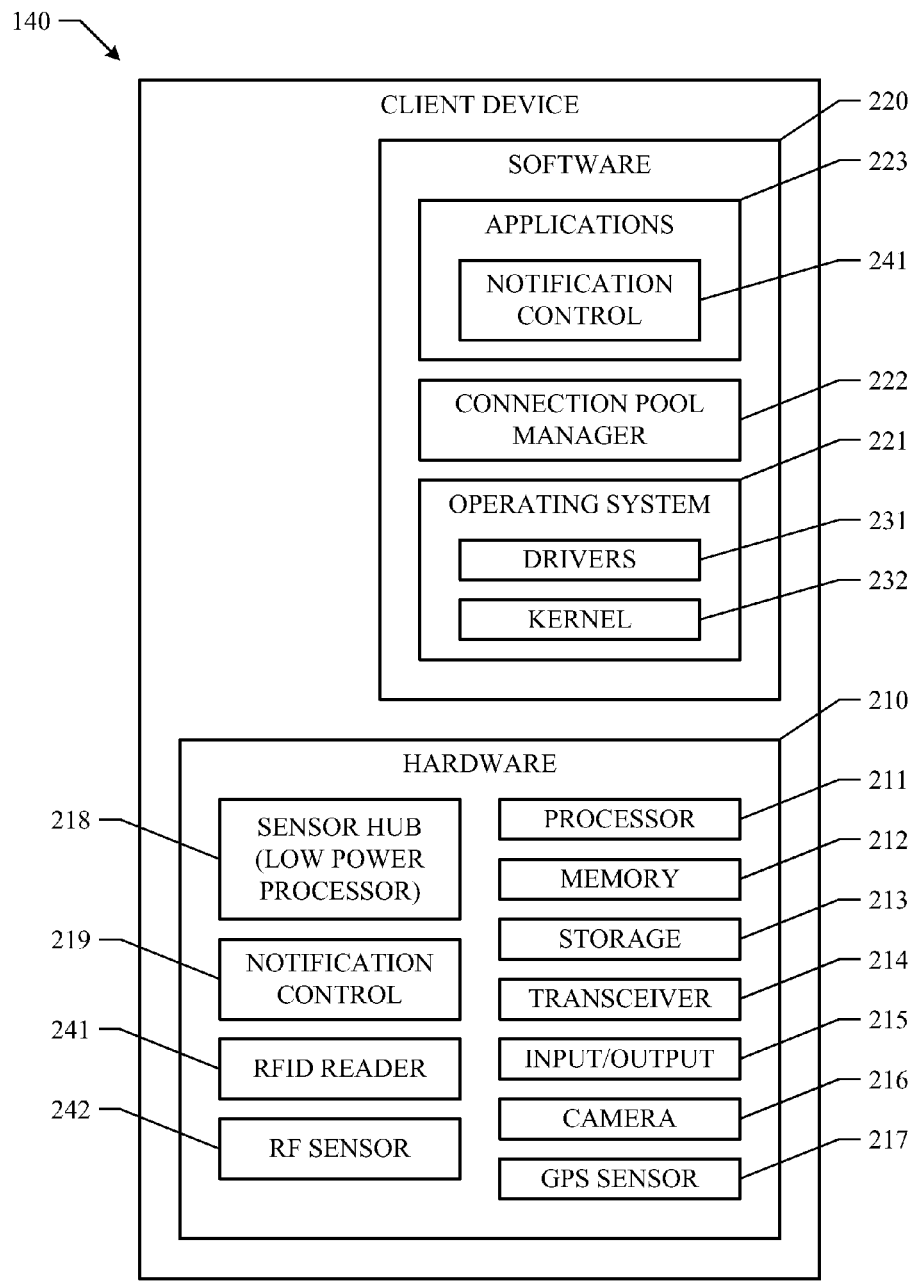
FIG. 3 illustrates an example user device.

In particular embodiments, a user device (e.g., a client 140) may include hardware, firmware, and software. FIG. 3 illustrates an example client device 140. In particular embodiments, client device 140 may be a smart phone (e.g., iPhone or Blackberry), which is a mobile telephone that offers more advanced computing ability and connectivity than a traditional mobile phone. It may be considered as a handheld computer integrated with a mobile phone. In particular embodiments, client device 140 may be a netbook or tablet computer (e.g., iPad). In particular embodiments, client device 140 may be connected to a network through a wireless connection.

In particular embodiments, client device 140 may include hardware 210 and software 220. In particular embodiments, hardware 210 may include any number of hardware components such as, for example and without limitation, processor 211, memory 212, storage 213, transceiver 214, input/output device 215 (e.g., display, touch screen, keypad, microphone, speaker, etc.), camera 216, global positioning system (GPS) sensor 217, sensors hub 218, notification control switch 219, RFID reader 241, RF sensor 242, and so on. This disclosure contemplates any suitable hardware components. Sensors hub 218, notification control switch 219, RFID reader 241, and RF sensor 242 are described in more detail below. In particular embodiments, some or all of a user's user data may be stored in storage 213.

In particular embodiments, software 220 may include an operating system 221, which may include a kernel 231 and/or any number of device drivers 232 corresponding to some of the hardware components available on client device 140. Operating system 221 may be selected for client device 140 based on the actual type of device client device 140 is. For example, if client device 140 is a mobile device (e.g., a smart phone), then operating system 221 may be a mobile operating system such as, for example and without limitation, Microsoft's Windows Mobile, Google's Android, Nokia's Symbian, Apple's iOS, and Samsung's Bada.

In particular embodiments, there may be a connection pool manager 222 residing and executing on client device 140, which may be implemented as computer software. Connection pool manager 222 is described in more detail below.

In particular embodiments, one or more software applications 223 may be executed on client device 140. In particular embodiments, they may be native applications installed and residing on client device 140. For example, one application (e.g., Google Maps) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using camera 216; a fifth application may allow the device user to receive and initiate VoIP and/or cellular network calls, and so on. In particular embodiments, there may be a software application (e.g., notification control 241) that enables the device user to manage the notifications pushed to client device 140. Notification control 241 is described in more detail below. Each software application 220 may have a user interface and may implement one or more specific functionalities. Each software application 220 may include one or more software modules implementing the individual functionalities. The executable code of software applications 220, including notification control 241, may be stored in a computer-readable and non-transitory medium (e.g., storage 213 or memory 212) on client device 140.

Managing Notifications Pushed to at User Device

Sometimes, a user may not wish to receive notifications pushed to his/her user device. For example, the user may be involved in some type of activity (e.g., in a meeting, having a meal, on the phone, or in a theatre) and not wish to be disturbed or interrupted by notifications pushed to his/her user device. Particular embodiments may enable a user to manage the notifications pushed to his/her user device through various means.

In particular embodiments, a user device may include a hardware component (e.g., notification control 219 illustrated in FIG. 3) in the form of, for example, a switch or a button. The user may turn on or off the notifications pushed to his/her user device by turning on or off notification control switch 219. For example, when the user turns on notification control switch 219, the user device establishes a connection with a server (e.g., an edge server 130 illustrated in FIGS. 1 and 2) and receives notifications pushed to it by the edge server. However, when the user turns off notification control switch 219, the edge server does not push any notification to the user device. In addition, the user device may be disconnected from the edge server.

In addition or alternatively, in particular embodiments, a user device may include a software application (e.g., notification control 241 illustrated in FIG. 3) that has a user interface (e.g., an on/off icon). The user may turn on and off the notifications pushed to his/her user device by clicking on the on/off icon. For example, the first time the user clicks on the icon, the notifications may be turned off, and the second time the user clicks on the icon, the notifications may be turned on again, and so on. When the notifications are turned off, no notification is pushed to the user device. In addition, the user device may be disconnected from the edge server.

Here, notification control 219 and notification control 241 essentially implement the same functionalities (i.e., turning on and off the notifications pushed to the user device). Notification control 219 is implemented as a hardware switch, while notification control 241 is implemented as a software switch. A user device may have both the hardware switch and the software switch, or only the hardware switch, or only the software switch.

Figure 4:
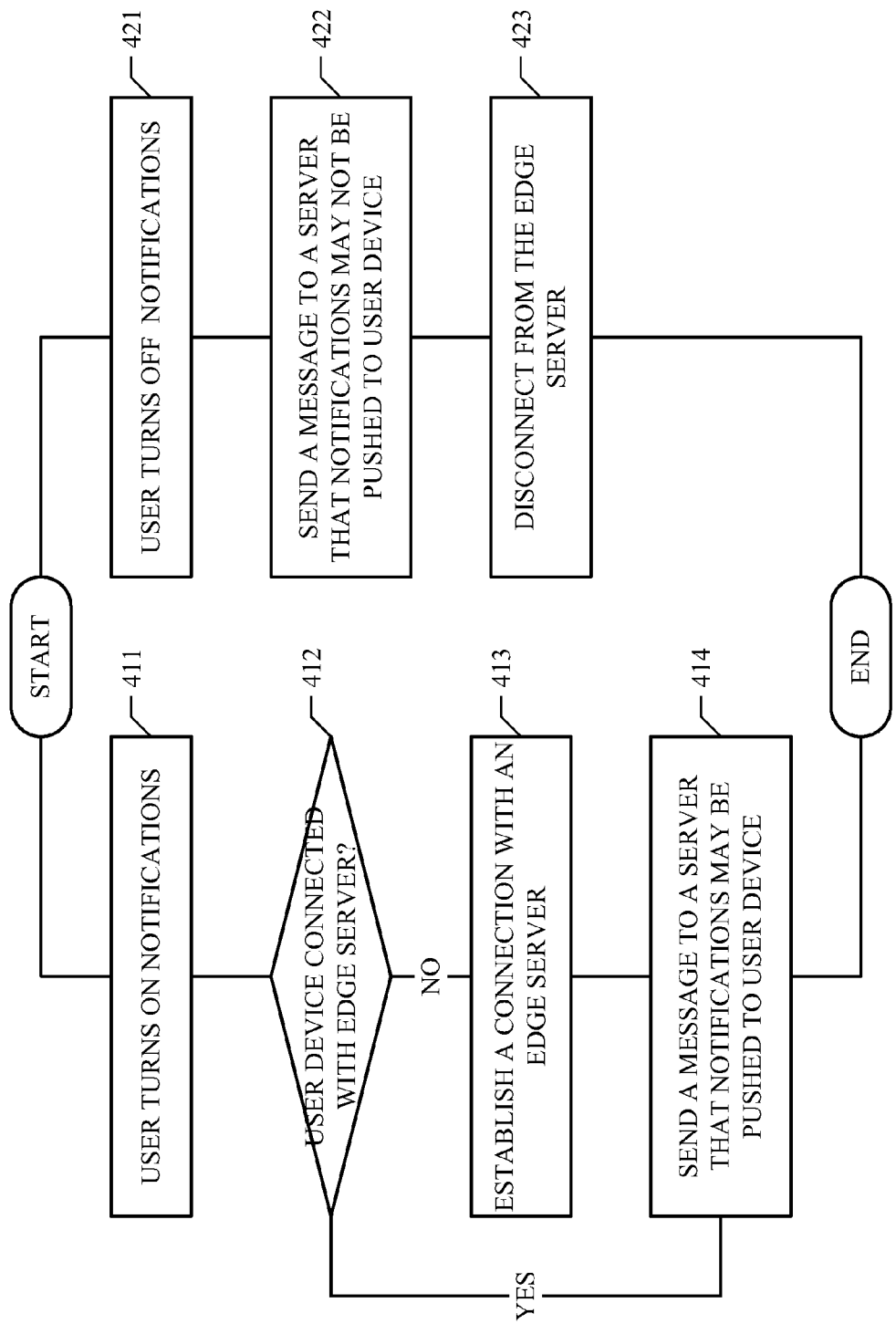
FIG. 4 illustrates an example method for turning on or off notifications pushed to a user using a hardware or software switch.

FIG. 4 illustrates an example method for turning on or off notifications pushed to a user device using either a hardware or a software switch. In particular embodiments, a user may turn on notifications using the hardware or software switch on his/her user device, as illustrated in STEP 411. This indicates that the user is willing to receive notifications pushed to his/her user device. The user device may check whether it is currently connected with a sever (e.g., an edge server 130 illustrated in FIGS. 1 and 2), as illustrated in STEP 412. If the user device is not currently connected with any edge server, the user device may establish a connection with an edge server, as illustrated in STEP 413.

To establish a connection with an edge server, in particular embodiments, the user device may access the social-networking website hosted by the web servers. A web server may map the user's identifier to a channel server. The channel server to which the user is assigned may select one of the edge servers connected to it for the user. The selected edge server may then establish a connection with the user device. The user device may go through the registration process described above with the selected edge server.

In particular embodiments, the user device may send a message to a web server hosting the social-networking website, indicating that the user has turned on notifications and is willing to receive notifications pushed to his/her user device, as illustrated in STEP 414. Thereafter, the social-networking website may push notifications to the user's device.

In particular embodiments, a user may turn off notifications using the hardware or software switch on his/her user device, as illustrated in STEP 421. This indicates that the user is not willing to receive notifications pushed to his/her user device. The user device may send a message to a web server hosting the social-networking website, indicating that the user has turned off notifications and is not willing to receive notifications pushed to his/her user device, as illustrated in STEP 422. Thereafter, the social-networking website may stop pushing notifications to the user's device. Optionally, in particular embodiments, the user device may sever its connection with and be disconnected from the edge server with which it has been connected, as illustrated in STEP 423.

In addition to hardware and software switches, notifications may be controlled by other means. In particular embodiments, whether to push notifications to a user's device may be determined based on the information in the user's calendar. Often, people may schedule events, such as appointments, meetings, or activities, in their calendars. Each entry in the calendar may have a time period, an event type (e.g., the nature of the event), and may optionally identify the participants of the event. The social-networking system may access a user's calendar information and determine when is or is not a good time to push notifications to the user's device. For example, if a user has a meeting scheduled on Monday between 10:00 am to 11:30 am in the user's calendar, then during this time, it may not be desirable to push notifications to the user's device as the notifications may disturb and distract the user from participating in the meeting. On the other hand, if there is no event scheduled on Monday between 1:00 pm and 3:00 pm in the user's calendar, then during this time, notifications may be pushed to the user's device as the user probably will not be disturbed by and thus get annoyed at the notifications.

In particular embodiments, a user may specify to the social-networking system (e.g., in the user's profile with the social-networking system) the types of events, if found in the user's calendar, during which the user does not wish to receive notifications at his/her user device. For example, a user may specify that during meetings, meals, and family functions, the user does not wish to receive notifications at her user device. In this case, whenever an event of the type specified by the user is found in her calendar, the social-networking system may refrain from pushing notifications to her user device during the event (i.e., while the event takes place). On the other hand, if an event not of the type specified by the user is found in her calendar, the social-networking system may still push notifications to her user device while the event takes place.

In particular embodiments, a user may specify to the social-networking system (e.g., in the user's profile with the social-networking system) specific time periods during which the user does not wish to receive notifications at his/her user device, regardless of whether any events are scheduled during these time periods. For example, a user may specify that on weekdays between 10:00 pm and 6:00 am and on weekends between 4:00 pm and 10:00 am the user does not wish to receive notifications at his user device. In this case, during such a time period, the social-networking system may refrain from pushing notifications to his user device even if no event has been scheduled during the time period in the user's calendar.

In particular embodiments, whether to push notifications to a user's device may be determined based on the location of the user's device (e.g., as determined by the GPS coordinates of the user's device). The social-networking system may push notifications to the user's device only when the device is at certain locations (e.g., the user's office or home, shopping malls, etc.) but may refrain from pushing notifications to the user's device only when the device is at other locations (e.g., movie theaters, restaurants, etc.).

In particular embodiments, a user may specify to the social-networking system (e.g., in the user's profile with the social-networking system) specific locations where the user does not wish to receive notifications at his/her user device. When the user's device is at such a location, no notification is pushed to the user's device. For example, a user may specify that she does not wish to receive notifications at her user device when she is at the Memorial Opera House in San Francisco, the Joya Restaurant in Palo Alto, the Tech Museum in San Jose, etc. The coordinates of each of these locations may be determined (e.g., from a map database). The current location of the user's device may be determined based on the GPS coordinates provided by the GPS sensor of the device (e.g., GPS sensor 217 illustrated in FIG. 3). When the GPS coordinates of the user device match the coordinates of one of the locations specified by the user, the social-networking system may refrain from pushing notifications to the user's device.

In particular embodiments, whether to push notifications to a user's device may be determined based on the proximity of the user's device to a person or an object. Often, a person or an object may carry or include a Radio-Frequency Identification (RFID) tag. RFID is a technology that uses communication via radio waves to exchange data between a RFID reader and a RFID tag attached to a person or object, for the purpose of, for example, identification and tracking. In particular embodiments, a user device may include a RFID reader (e.g., RFID reader 241 illustrated in FIG. 3). The RFID reader of the user device may scan RFID tags attached to people and objects. Based on the scanned information, the user device may determine its proximity to a RFID tag, and thus to the person or object carrying the RFID tag. In particular embodiments, notifications may not be pushed to a user's device when the RFID reader of the device indicates that the device is in close proximity to a person or object carrying a specific type of RFID tag. For example, a user, who is a parent, may attached a RFID tag to his young child for safety reasons. The user may specify to the social-networking system that he does not wish to receive notifications at his user device when the user device is in close proximity to his young child. The RFID reader of the user device may detect the device's proximity to the RFID tag attached to the child. If the user device is sufficiently close to the RFID tag attached to the child, the user device may inform the social-networking system, and the social-networking system may refrain from pushing the notifications to the user device until the user device moves sufficiently away from the RFID tag attached to the child.

Near Field Communication (NFC) is a set of short-range wireless technologies, typically requiring a distance of 4 cm or less. NRC generally involves an initiator and a target. The initiator actively generates an RF (radio frequency) field that can power a passive target. In particular embodiments, NFC may also be used to determine a user device's proximity to a person or object. The user device may be either the initiator or the target. For example, the user device may include a suitable RF sensor (e.g., RF sensor 242 illustrated in FIG. 3) or a RF field generator. In particular embodiments, notifications may not be pushed to a user's device if the user device determines, based on NRC technologies, that it is in close proximity to a person or object specific by the user.

Performing Selected Operations with a Low Power-Consuming Processor

In particular embodiments, a user device may include various types of sensors and other input/output devices for providing additional inputs and facilitate various functionalities implemented by the user device. For example, in FIG. 3, device 140 includes GPS sensor 217 for location positioning. Other types of sensors that may be included in a user device may include, for example and without limitation, altimeter for altitude positioning, motion sensor for determining the orientation of a user device, light sensor for photographing function with a camera (e.g., camera 216 illustrated in FIG. 3), temperature sensor for measuring ambient temperature, biometric sensor for security applications (e.g., fingerprint reader), and so on. These sensors may form a sensor subsystem on the user device. Other input/output (I/O) devices may include radio network interfaces implemented by transceiver 214 in combination with additional hardware, software and/or firmware.

In particular embodiments, in addition to the main or primary processors (e.g., processor 211 illustrated in FIG. 3), a user device may have one or more other (e.g., secondary) processors for managing the sensors and other I/O devices included in the user device. In particular embodiments, these "secondary" processors that manage the sensors may be low power-consuming processors and may be referred to as a sensors hub (e.g., sensors hub 218 illustrated in FIG. 3). A sensors hub included in a user device may, for example, control the sensors, manage power for the sensors, process sensor inputs, aggregate sensor data, and perform certain sensor functions. This may, to a certain extent, free up the main processor of the user device to perform other operations (e.g., executing the operating system or software applications).

Figure 5:
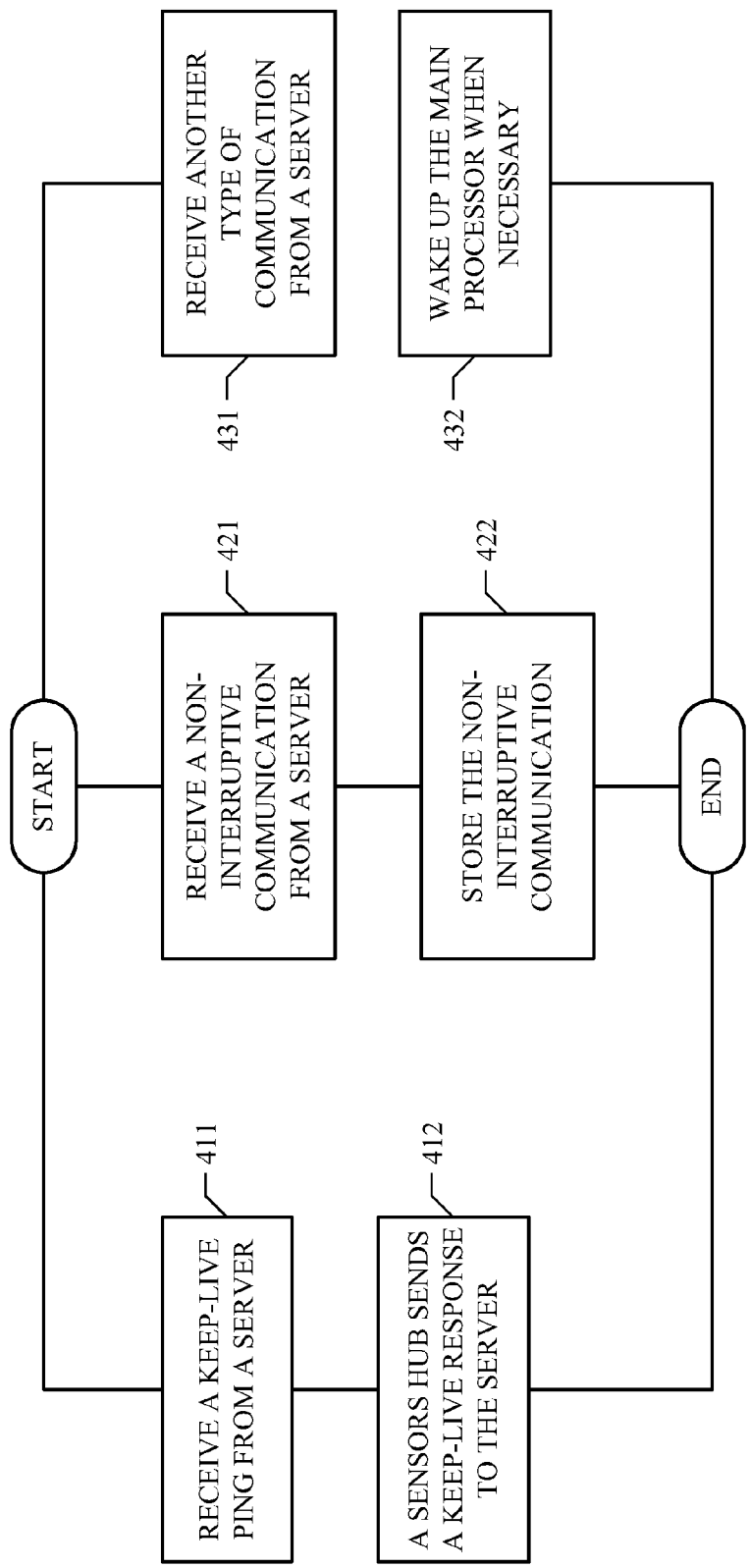
FIG. 5 illustrates an example method that a sensors hub may perform certain tasks.

As described above in connection with FIGS. 1 and 2, a user device (e.g., a client 140 illustrated in FIGS. 1 and 2) may be connected with a server (e.g., an edge server 130 illustrated in FIGS. 1 and 2) wirelessly or through a wired connection. From time to time, the server may push notifications to the user device over the connection between them. Instead of establishing a new connection each time the server wants to push a notification to the user device, a connection between the server and the user device, once established, may be kept "alive" (i.e., connected) for some period of time so that the server may push multiple notifications to the user device over the same connection. This may help save some of the resources needed to reestablish the connection again and again. FIG. 5 illustrates an example method that a sensors hub may perform certain tasks.

In particular embodiments, while the server and the user device are connected, the server may ping the user device periodically to determine whether the user device is still available (i.e., whether the connection with the user device is still alive). The server may send a "keep-alive" ping (e.g., a small data packet) to the user device over the connection. If the user device is still available (e.g., at the other end of the connection) and receives the "keep-alive" ping, then the user device may send an acknowledgement back to the server over the connection, in which case the server knows that the user device is still available and the connection is still alive. On the other hand, if the user device is no longer available, then no acknowledgement to the "keep-alive" ping may be sent back by the user device, in which case the server knows that the user device is no longer available and the connection no longer exists between the server and user device.

When a user device receives a message, a network interface may transmit the message data into memory 212 and transmit an interrupt that causes a processor (e.g., processor 211 illustrated in FIG. 3) to process the message. In particular embodiments, when a user device receives a "keep-alive" ping from a server, as illustrated in STEP 411, instead of having the main processor of the user device answer the "keep-alive" ping, a sensors hub of the user device answers the "keep-alive" ping from the server and sends a response to the server, as illustrated in STEP 412. In one implementation, this can be implemented by having the sensors hub (e.g., sensors hub 218 illustrated in FIG. 3) intercept and/or filter interrupts while the main processor (e.g., processor 211 illustrated in FIG. 3) is in sleep mode. In alternative embodiment, the network interface may be programmed to transmit interrupts to the sensors hub while the main processor is in sleep mode. A sensors hub often consumes less power than a main processor. A server may send many "keep-alive" pings to a user device during the lifetime of a connection between them. By having the sensors hub answer the "keep-alive" pings and send back the acknowledgements to the server, less power of the user device may be needed.

Often, a user device may have its main or primary processor go into a sleep mode when no operation needs to be performed by the main processor to save power. For example, when the user device is in stand-by mode, its main processor may go into sleep mode. When the user device receives a "keep-alive" ping from the server while its main processor is in sleep mode, the main processor does not need to be woken up to answer the "keep-alive" ping, since the sensors hub is able to answer the "keep-alive" ping instead. Note that the sensors hub may answer the "keep-alive" pings regardless of whether the main processor is currently in sleep mode.

In particular embodiments, the user device may receive a non-interruptive notification pushed to the user device by the server, as illustrated in STEP 421. If the main processor of the user device is currently in sleep mode, the sensors hub may store the non-interruptive notification on the user device, as illustrated in STEP 422. The notification may be presented to the user at a future time when the main processor wakes up.

As described above, non-interruptive notifications do not require a user's immediate attention. For example, they may be low-priority communications. Thus, it often is not necessary to present non-interruptive notifications to the user immediately after they are received. If the main processor of the user device is currently in an operational mode (i.e., awake) when a non-interruptive nonfiction is received, then the non-interruptive nonfiction may be presented to the user right away. However, if the main processor of the user device is currently in sleep mode when a non-interruptive nonfiction is received, then it is not necessary to wake up (e.g., transmit an interrupt or other message) the main processor for the sole purpose of presenting the non-interruptive nonfiction to the user immediately. The sensors hub may store the non-interruptive nonfiction for presentation to the user at a future time. This may save some power for the user device since the main processor is not waken up each time a non-interruptive nonfiction is received at the user device.

In particular embodiments, the user device may receive an interruptive notification pushed to the user device by the server, as illustrated in STEP 431. As described above, interruptive notifications require a user's immediate attention. For example, they may be high-priority communications. If the main processor of the user device is currently in sleep mode, the sensors hub may wake up the main processor to handle the interruptive notification, as illustrated in STEP 432. In addition, while the main processor of the user device is in sleep mode, the sensors hub may monitor the operational status of the user device. If there is any task that needs to be performed by the main processor immediately, the sensors hub may wake up the main processor to perform the task. Of course, whether a task needs to be performed by the main processor immediately may depend on the configuration or the specification of the user device (e.g., including hardware and software configurations or specifications), which may be specified by the user or the designer or the manufacturer of the user device.

Managing a Pool of Network Connections for a User Device

In particular embodiments, a "connection pool" may be a cache of network or communication connections between two devices maintained so that the connections may be reused when the two devices need to communicate (e.g., send data) to each other. In particular embodiments, either one or both devices may have a connection pool manager that manages the cache of connections in the pool. For example, in FIG. 3, client device 140 includes connection pool manager 222.

As described above in connection with FIGS. 1 and 2, a user device (e.g., a client 140 illustrated in FIGS. 1 and 2) may be connected with a server (e.g., an edge server 130 illustrated in FIGS. 1 and 2) wirelessly or through a wired connection. In particular embodiments, there may be a pool of cached network or communication connections (e.g., wired or wireless connections) between the user device and the edge server. For example, each connection in the pool may be a socket connection. Each connection in the pool may support various network or communication protocols, such as, for example and without limitation, TCP/IP (the Internet Protocol Suite), and HTTP (Hypertext Transfer Protocol). In particular embodiments, if a server is connected with multiple user devices, then there is a connection pool between the server and each of the user devices. That is, each user device has its own connection pool and does not need to share the same connection pool with another user device also connected with the same server. Of course, a connection pool may be maintained between any two devices.

FIG. 6 illustrates an example connection pool 600, which includes connections 610-A to 610-E, maintained between an edge server 130 and a client device 140 (i.e., a user device). Note that only a few connections are illustrated in FIG. 6 to simplify the discussion. In practice, a connection pool may include any number of network or communication connections. As described above, client 140 may include a connection pool manager 222 and any number of software applications 223.

In particular embodiments, some of the connections (e.g., connection 610-A) in the pool may be reserved for and dedicated to certain specific tasks. For example, connection 610-A may be reserved for receiving notifications pushed to a client 140 from a social-networking system (e.g., through edge server 130) and/or keep alive messages as discussed above. Other asynchronous tasks (e.g., data logging) may also have dedicated connections in connection pool 600. Other connections (e.g., connections 610-B to 610-E) in the pool may be shared among software applications 223. In particular embodiments, connection pool manager 222 may manage the sharing of the connections in the pool among software applications 223.

FIG. 7 illustrates an example method for sharing connections in a connection pool among multiple software applications executing on a client. In particular embodiments, suppose that the client has established and maintains a pool (e.g., a set) of network or communication connections, and the client has a connection pool manager (e.g., implemented as computer software) for managing the connections in the pool. A software application (e.g., a web browser or an email application) executing on the client may initiate a request to connect to a server, as illustrated in STEP 711. In particular embodiments, the connection pool manager executing on the client may intercept the request, as illustrated in STEP 712, so that the operating system of the client does not establish a new connection between the client and the server for the software application in response to the request.

In particular embodiments, the connection pool manager may select an available connection (e.g., an available socket connection) from the connection pool and assign this available connection to the software application, as illustrated in STEP 713. In particular embodiments, a connection in the pool is available if it is not reserved for and dedicated to some types of tasks (e.g., for push notifications or asynchronous tasks) and it is not currently used by any software application executing on the client. The software application may then use this connection to communicate with the server. When the software application is done with communicating with the server, the connection is released and returned to the connection pool so that it may be used by another software application subsequently. In some implementations, additional connections can be opened, if all open connections have been allocated to a given task.

In particular embodiments, the connection pool manager may keep track of the current status of each connection in the pool, such as, whether a connection is reserved for and dedicated to a specific task and whether a connection is currently used by a software application. This allows the connection pool manager to determine, at any given time, which connection in the pool is currently available and may be assigned to a software application making a network request.

By maintaining a connection pool so that the connections in the pool, once established, may be shared and reused, it is not necessary that a new connection needs to be established each time an application or the operating system of the user device needs a network or communication connection. This may improve performance for the user device by not having to do the handshakes necessary to establish the new connections.

If the user device is a mobile device having wireless connections (i.e., the connections in the connection pool are wireless connections), then the mobile device may move from location to location (i.e., roam) or there may be small interruptions in the wireless connectivity from time to time. The wireless connections in the pool may or may not survive roaming or the connectivity interruptions. For example, if a connectivity interruption is small enough that the user device does not actually lose the connections all together, the connection pool may survive such an interruption. But if a connectivity interruption is severe enough, the connection pool may not be able to survive such an interruption (i.e., the connections in the pool are lost), in which case new connections may need to be established. As another example, suppose that the mobile device has roamed from one location to another location and needs to be handed off to a different base station. This may cause the connections in the pool to be lost, in which case new connections may need to be established (e.g., through the new base station).

Figure 8:
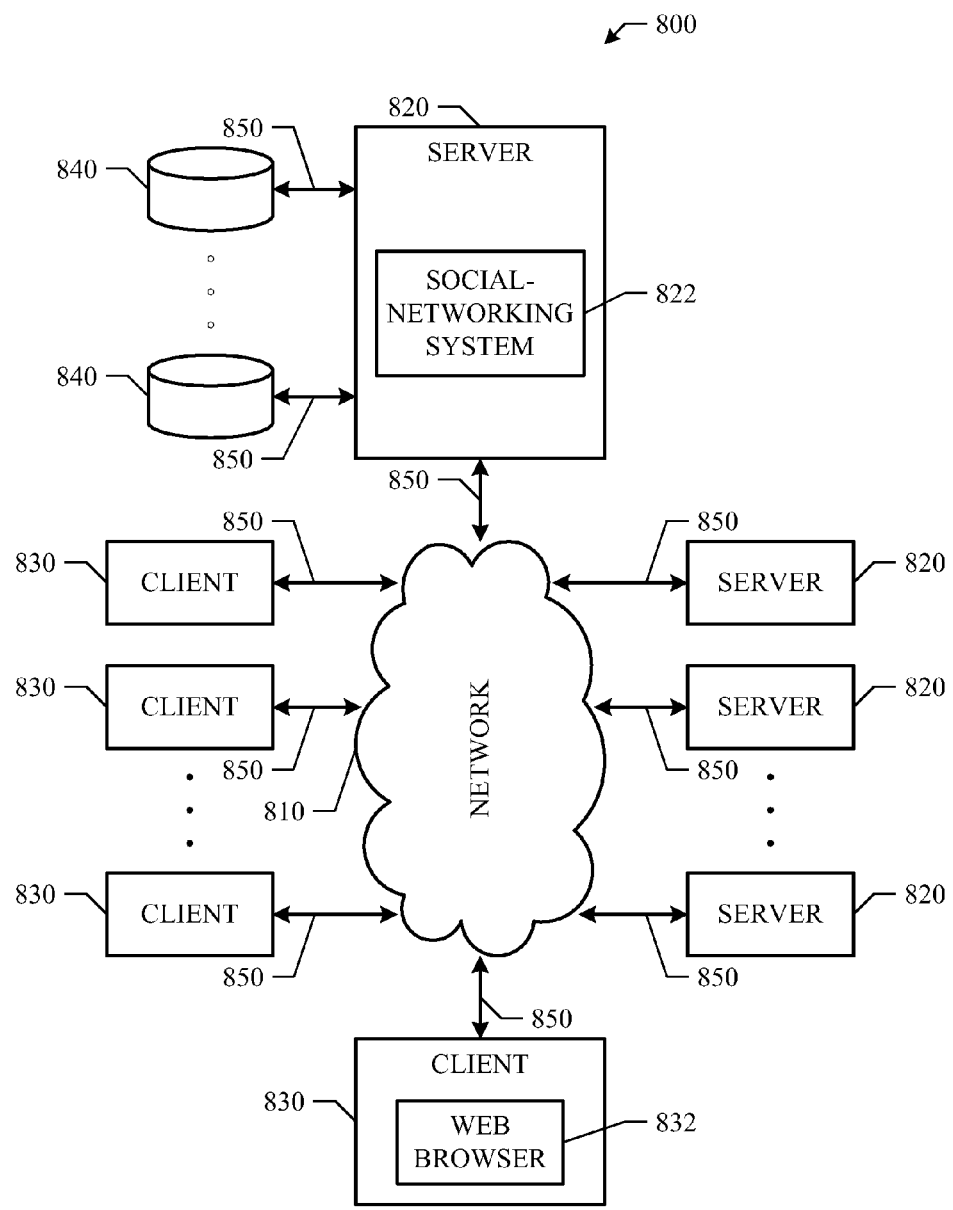
FIG. 8 illustrates an example network environment.

Particular embodiments may be implemented in a network environment. FIG. 8 illustrates an example network environment 800. Network environment 800 includes a network 810 coupling one or more servers 820 and one or more clients 830 to each other. In particular embodiments, network 810 is an intranet, an extranet, a virtual private network (VPN), a local area network (LAN), a wireless LAN (WLAN), a wide area network (WAN), a metropolitan area network (MAN), a portion of the Internet, or another network 810 or a combination of two or more such networks 810. This disclosure contemplates any suitable network 810.

One or more links 850 couple a server 820 or a client 830 to network 810. In particular embodiments, one or more links 850 each includes one or more wireline, wireless, or optical links 850. In particular embodiments, one or more links 850 each includes an intranet, an extranet, a VPN, a LAN, a WLAN, a WAN, a MAN, a portion of the Internet, or another link 850 or a combination of two or more such links 850. This disclosure contemplates any suitable links 850 coupling servers 820 and clients 830 to network 810.

In particular embodiments, each server 820 may be a unitary server or may be a distributed server spanning multiple computers or multiple datacenters. Servers 820 may be of various types, such as, for example and without limitation, web server, news server, mail server, message server, advertising server, file server, application server, exchange server, database server, or proxy server. In particular embodiments, each server 820 may include hardware, software, or embedded logic components or a combination of two or more such components for carrying out the appropriate functionalities implemented or supported by server 820. For example, a web server is generally capable of hosting websites containing web pages or particular elements of web pages. More specifically, a web server may host HTML files or other file types, or may dynamically create or constitute files upon a request, and communicate them to clients 830 in response to HTTP or other requests from clients 830. A mail server is generally capable of providing electronic mail services to various clients 830. A database server is generally capable of providing an interface for managing data stored in one or more data stores. In particular embodiments, a social-networking system 822, implementing a social-networking website, may be hosted on one or more servers 820.

In particular embodiments, one or more data storages 840 may be communicatively linked to one or more severs 820 via one or more links 850. In particular embodiments, data storages 840 may be used to store various types of information. In particular embodiments, the information stored in data storages 840 may be organized according to specific data structures. In particular embodiments, each data storage 840 may be a relational database. Particular embodiments may provide interfaces that enable servers 820 or clients 830 to manage, e.g., retrieve, modify, add, or delete, the information stored in data storage 840.

In particular embodiments, each client 830 may be an electronic device including hardware, software, or embedded logic components or a combination of two or more such components and capable of carrying out the appropriate functionalities implemented or supported by client 830. For example and without limitation, a client 830 may be a desktop computer system, a notebook computer system, a netbook computer system, a handheld electronic device, or a mobile telephone. This disclosure contemplates any suitable clients 830. A client 830 may enable a network user at client 830 to access network 830. A client 830 may enable its user to communicate with other users at other clients 830.

A client 830 may have a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 830 may enter a Uniform Resource Locator (URL) or other address directing the web browser 832 to a server 820, and the web browser 832 may generate a Hyper Text Transfer Protocol (HTTP) request and communicate the HTTP request to server 820. Server 820 may accept the HTTP request and communicate to client 830 one or more Hyper Text Markup Language (HTML) files responsive to the HTTP request. Client 830 may render a web page based on the HTML files from server 820 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 9:
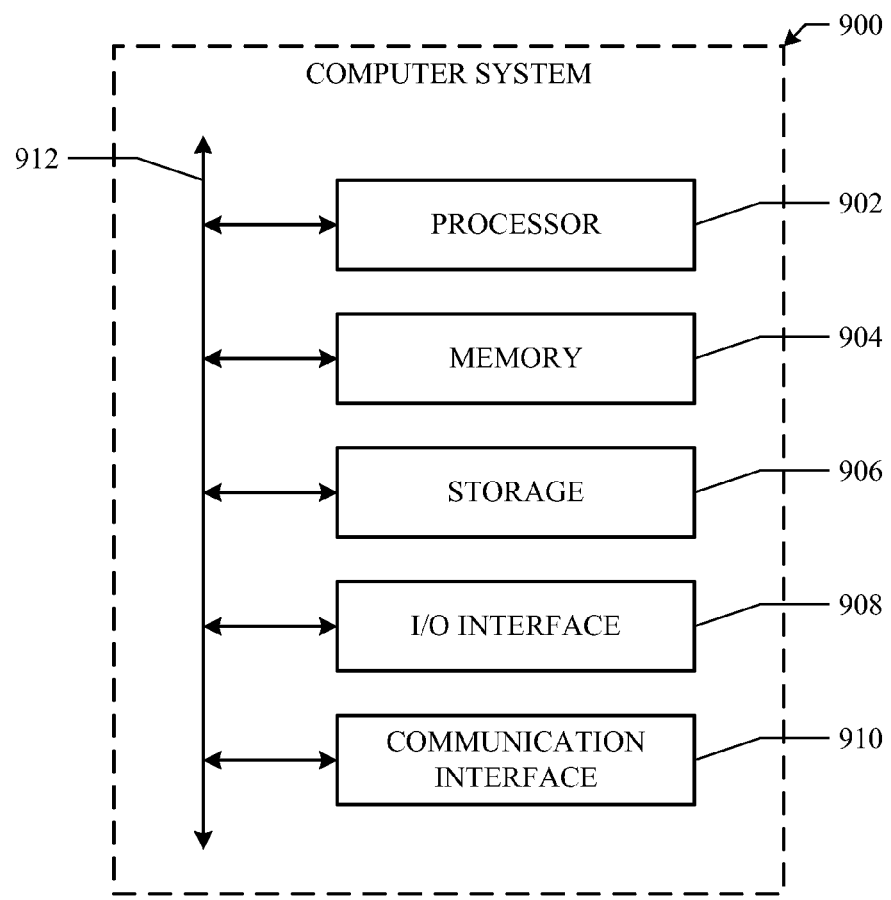
FIG. 9 illustrates an example computer system.

Particular embodiments may be implemented on one or more computer systems. FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include an HDD, a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 902 (such as, for example, one or more internal registers or caches), one or more portions of memory 904, one or more portions of storage 906, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a first computing device, receiving a first communication from a second computing device, wherein the first computing device is a mobile client computing device, and wherein the first communication is received while a primary processor of the first computing device is in sleep mode;
   by the first computing device, if the first communication is a ping from the second computing device, then sending a response to the ping to the second computing device using a secondary processor of the first computing device;
   by the first computing device, if the first communication is not a ping from the second computing device, then determining by the secondary processor if the first communication should be handled by the primary processor, wherein the determining is based at least in part on:
      a relevance score of the first communication with respect to a user of the first computing device, wherein the relevance score is calculated by combining:
         a location value based on the location of an entity associated with the first communication and a current location of the user;
         an interest value based on determining whether the entity associated with the first communication is included in interests of the user;
         a time value based on whether the current time is within a predetermined delivery time range for the entity associated with the first communication; and
         a connection value based on a number of the user's social connections associated with the entity associated with the first communication; and
      a current operational status of the first computing device based at least in part on one or more sensors of the first computing device operated by the secondary processor;
   by the first computing device, while the primary processor of the first computing device is still in sleep mode:
      determining that the first communication has a low priority; and
      storing the first communication using a secondary processor of the first computing device;
   by the first computing device, monitoring an internal operational status of the first computing device based at least in part on one or more sensors of the first computing device operated by the secondary processor while a primary processor of the first computing device is in sleep mode, wherein the one or more sensors are monitoring an internal state of the first computing device; and
   by the first computing device, responsive to the monitoring of the internal operational status of the first computing device, if there is a task that needs to be performed by the primary processor, then waking up the primary processor using the secondary processor.

2. The method of claim 1, further comprising:
receiving a second communication;
determining that the second communication has a high priority; and
waking up the primary processor using the secondary processor.

3. The method of claim 1, wherein the one or more sensors of the first computing device comprise:
an altimeter;
a motion sensor;
a light sensor;
a temperature sensor; or
a biometric sensor.

4. The method of claim 1, wherein the secondary processor is a sensors hub of the first computing device.

5. The method of claim 1, wherein the secondary processor is a low-power-consuming processor.

6. The method of claim 1, wherein the relevance score is calculated by multiplying together the location value, interest value, time value, and connection value.

7. A first system comprising:
one or more primary processors;
one or more secondary processors; and
one or more computer-readable non-transitory storage media embodying logic that is operable when executing on the first system to:
receive a first communication from a second system, wherein the first system is a mobile client computing device, and wherein the first communication is received while a primary processor of the first computing device is in sleep mode;
if the first communication is a ping from the second system, then send a response to the ping to the second system using a secondary processor of the first system;
if the first communication is not a ping from the second computing device, then determine by the secondary processor if the first communication should be handled by the primary processor, wherein the determining is based at least in part on:
a relevance score of the first communication with respect to a user of the first computing device, wherein the relevance score is calculated by combining:
a location value based on the location of an entity associated with the first communication and a current location of the user;
an interest value based on determining whether the entity associated with the first communication is included in interests of the user;
a time value based on whether the current time is within a predetermined delivery time range for the entity associated with the first communication; and
a connection value based on a number of the user's social connections associated with the entity associated with the first communication; and
a current operational status of the first computing device based at least in part on one or more sensors of the first computing device operated by the secondary processor;
while the primary processor of the first computing device is still in sleep mode:
determine that the first communication has a low priority; and
store the first communication using a secondary processor of the first computing device;
monitor an internal operational status of the first computing device based at least in part on one or more sensors of the first computing device operated by the secondary processor while a primary processor of the first computing device is in sleep mode, wherein the one or more sensors are monitoring an internal state of the first computing device; and
responsive to the monitoring of the internal operational status of the first computing device, if there is a task that needs to be performed by the primary processor, then wake up the primary processor using the secondary processor.

8. The first system of claim 7, wherein the logic is further operable when executing on the first system to:
receive a second communication;
determine that the second communication has a high priority; and
wake up the primary processor using the secondary processor.

9. The first system of claim 7, wherein the one or more sensors of the first computing device comprise:
an altimeter;
a motion sensor;
a light sensor;
a temperature sensor; or
a biometric sensor.

10. The first system of claim 7, wherein one or more of the secondary processors are sensors hubs of the first system.

11. The first system of claim 7, wherein the secondary processors are low-power-consuming processors.

12. The first system of claim 7, wherein the relevance score is calculated by multiplying together the location value, interest value, time value, and connection value.

13. One or more computer-readable non-transitory storage media embodying logic that is operable when executing on a first computing device to:
receive a first communication from a second system, wherein the first system is a mobile client computing device, and wherein the first communication is received while a primary processor of the first computing device is in sleep mode;
if the first communication is a ping from the second system, then send a response to the ping to the second system using a secondary processor of the first system;
if the first communication is not a ping from the second computing device, then determine by the secondary processor if the first communication should be handled by the primary processor, wherein the determining is calculated by combining:
a relevance score of the first communication with respect to a user of the first computing device, wherein the relevance score is based on one or more of:
a location value based on the location of an entity associated with the first communication and a current location of the user;
an interest value based on determining whether the entity associated with the first communication is included in interests of the user;
a time value based on whether the current time is within a predetermined delivery time range for the entity associated with the first communication; and a connection value based on a number of the user's social connections associated with the entity associated with the first communication; and a current operational status of the first computing device based at least in part on one or more sensors of the first computing device operated by the secondary processor;

while the primary processor of the first computing device is still in sleep mode:

determine that the first communication has a low priority; and store the first communication using a secondary processor of the first computing device;

monitor an internal operational status of the first computing device based at least in part on one or more sensors of the first computing device operated by the secondary processor while a primary processor of the first computing device is in sleep mode, wherein the one or more sensors are monitoring an internal state of the first computing device; and responsive to the monitoring of the internal operational status of the first computing device, if there is a task that needs to be performed by the primary processor, then wake up the primary processor using the secondary processor.

14. The media of claim 13, wherein the logic is further operable when executing on the first computing device to:

receive a second communication;

determine that the second communication has a high priority; and wake up the primary processor using the secondary processor.

15. The media of claim 13, wherein the one or more sensors of the first computing device comprise:

an altimeter;
a motion sensor;
a light sensor;
a temperature sensor; or
a biometric sensor.

16. The media of claim 13, wherein the secondary processor is a low-power-consuming processor.

17. The media of claim 13, wherein the relevance score is calculated by multiplying together the location value, interest value, time value, and connection value.

\* \* \* \* \*